United States Patent Office 2,788,502
Patented Apr. 9, 1957

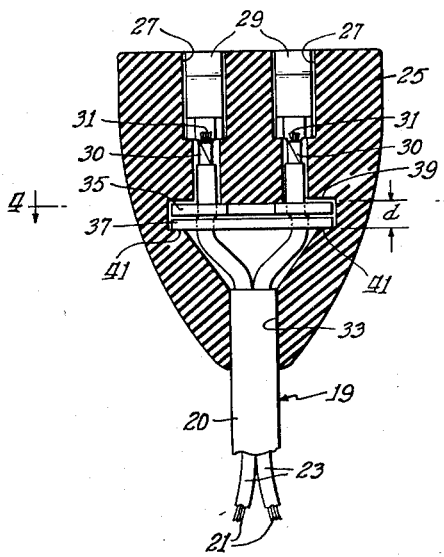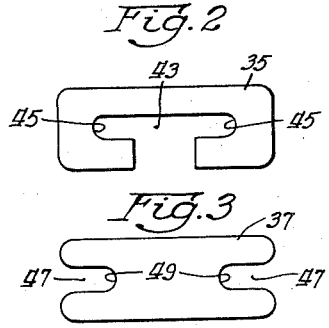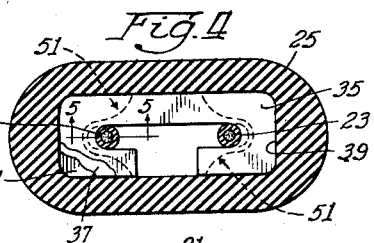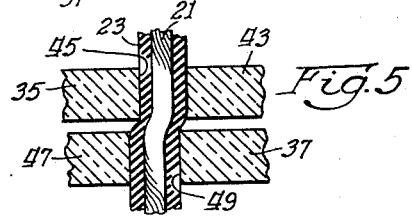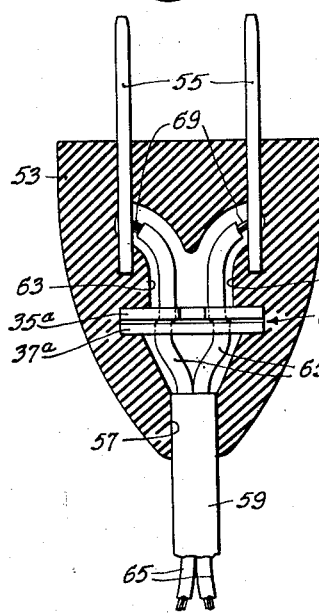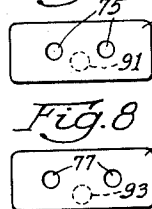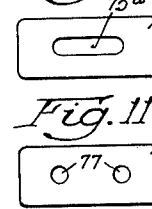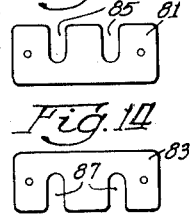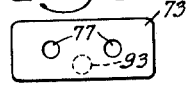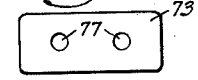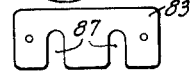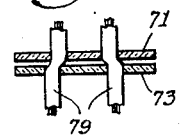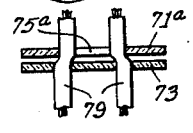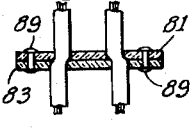

2,788,502

STRAIN RELIEF FOR ELECTRICAL CONDUCTOR

Robert K. Schelke and Russell R. Alexander, Richmond, Ind., assignors to Belden Manufacturing Company, Chicago, Ill., a corporation of Illinois Application June 25, 1953, Serial No. 363,990

5 Claims. (Cl. 339—105)

The present invention relates to strain reliefs and particularly to strain reliefs for use with electrical cord connectors.

Strain reliefs of various types are used to prevent damage to the electrical connections between electrical conductor cords and the electrical connectors used in conjunction with such cords. In this use, the strain relief is required to satisfy a number of exacting and somewhat conflicting requirements. Of primary importance, the strain relief unit must effectively relieve the electrical connections to the associated connector or other apparatus from mechanical strain. At the same time, this relief of strain should be accomplished in such manner that the stresses imparted to the cord conductors in the region of the strain relief are minimized. This latter is especially important when the cord and the connector are subject to shock stress, such as frequently occurs when a connector plug is pulled out of an outlet by tugging on the end of the cord.

In addition to these mechanical requirements, it is essential that a satisfactory strain relief shall be inexpensive to manufacture and to install.

The strain reliefs available in the past, while satisfying some of the above requirements, have, in general, been unsatisfactory in at least one respect. Those which have produced the most effective strain relief characteristics have been expensive to manufacture or to install, or have been of such design that undue stresses are generated in the cord conductors or elsewhere during use of the device. Those which have been sufficiently low in cost have, in general, failed to meet the other requirements.

Accordingly, the principal object of the present invention is to provide an improved strain relief, especially adapted for use in connection with electrical connector plugs and the like, which will effectively prevent the transmission of substantial strains to the electrical connections between the cord and the connector contacts during use of the unit, which shall accomplish its strain relief function without unduly stressing the cord conductors or the cord insulation, and which, at the same time, shall be low in cost and easy to install.

As will hereinafter appear, this object is accomplished by the provision of a strain relief which consists of a pair of inter-engaging members, conveniently manufactured by a punching operation, which can be readily applied to the cord conductor with which the strain relief is used, and which are adapted to be received within a suitable recess provided in the connector body. The arrangement of the parts is such that the resistance to stress provided by the strain relief increases automatically and gradually in the event of shock or unusually severe strains, and the unit is effective to minimize the likelihood of conductor or insulation damage, even after repeated use.

The various features and advantages of the invention will be made more apparent in the accompanying drawings and the following description of certain preferred embodiments thereof. In the drawings:

Figure 1 is a sectional view of a female type connector plug embodying a strain relief device in accordance with the invention;

Figures 2 and 3 are plan views of the two structural elements constituting the strain relief device embodied in the apparatus illustrated in Figure 1;

Figure 4 is a cross-sectional view taken on the general line 4—4 of Figure 1;

Figure 5 is a greatly enlarged, fragmentary, cross-sectional view taken on the line 5—5 of Figure 4;

Figure 6 is a cross-sectional view of a strain relief device, in accordance with the invention, as used in a male type terminal connector;

Figures 7 and 8 are plan views of the two constituent members of another type strain relief embodying certain of the features of the invention;

Figure 9 is a sectional view, illustrating the strain relief elements of Figures 7 and 8 assembled for use with a conductor cord;

Figures 10 and 11 illustrate the structural features of a third type of strain relief embodying features of the invention;

Figure 12 is a sectional view similar to Figure 9 of the structure illustrated in Figures 10 and 11;

Figures 13 and 14 illustrate the features of still another embodiment of the invention; and Figure 15 is a sectional view, similar to Figures 9 and 12, of the structure illustrated in Figures 13 and 14.

In Figure 1, reference numeral 19 indicates generally a duplex, electrical conductor cord or cable comprising an outer sheath 20 and a pair of stranded conductor wires 21, each of which is enclosed in an insulating jacket 23. The cord 19 is connected to a female-type, electrical connector plug, which includes a body or housing 25 of insulating material. The plug body 25 may comprise two complementary half sections which are joined together during use; it may consist of a single, one-piece molded unit; or it may be of the type shown in Wermine Patent No. 1,858,196, in which construction the central portion of the plug body, intermediate the connector contacts, constitutes a separate element which is held in position by resilient interlocking engagement with the outer body portion. The plug body 25 may be made of rubber compound, synthetic resin or other suitable insulating material.

The upper end of the plug body 25 is recessed, as illustrated at 27, to receive a pair of electrical contacts 29. The lower end of each of the contacts 29 has a conductor-engaging portion 30, which is mechanically and electrically connected to a bared end portion 31 of one of the conductor wires 21. The adjacent end of the conductor cord 19 is admitted to the interior of the plug body 25 through a suitable central passageway, as shown at 33.

The strain relief means in accordance with the invention embodied in this structure comprises a pair of relatively thin, coacting elements 35 and 37, which are illustrated in Figures 2 and 3. As there shown, one of these elements, the member 35, is generally C-shaped in outline, and the other, the member 37, is generally H-shaped. The two strain relief elements 35 and 37 are conveniently manufactured from thin, sheet material by a punching operation or they may be molded. Phenolic resin punch sheet material .046 inch in thickness, is, for example, a suitable material.

During use, it is intended that the two elements 35 and 37 shall be superposed, one on top of the other, and applied to the jacketed conductors, as illustrated in Figures 1 and 4. The plug body 25 includes a recess 39 for receiving the strain relief elements, and this recess provides shoulders 41 against which the outer portions of the under surface of the lower strain relief element will abut during use. Also, it is desirable that the depth of the recess 39 (its vertical dimension "d" in Figure 1) shall be slightly greater than the combined thickness of the two strain relief elements 35 and 37.

As best shown in Figures 2 and 3, the C-shaped element 35 includes a single, elongated, centrally-disposed slot 43 having a curved, defining edge 45 at either end thereof. Similarly, the H-shaped element 37 has a pair of centrally disposed slots 47, also having curved defining edges, as illustrated at 49. Conveniently, the curved edges 45 and 49 are semi-circular and of equal radii.

The dimensions of the slots 43 and 47 and the shape of the curved edges 45 and 49 are such that when the two strain relief elements 35 and 37 are applied to the jacketed conductors of the cable or cord with which the strain relief is being used, the slots are in only partial registry. Specifically, the defining edges of the cooperating slots 43 and 47 in the strain relief elements 35 and 37 are so positioned with reference to each other that the cross-sectional area of the resulting conductor-receiving openings provided by the coacting curved portions 45 and 49 of the slots will be less than the cross-sectional area of the jacketed conductors with which the strain relief is used.

The result of this is to provide an off-set, reduced area passageway through the assembled strain relief elements for receiving the jacketed conductors to which the strain relief is applied, as illustrated particularly in Figure 5. The net effect of the arrangement is to cause the strain relief elements to tightly grip the insulated cord conductors and to produce a strong, reliable mechanical connection between the strain relief elements and the associated conductors. Further, the cross-sectional area of these conductor-receiving passageways is, to some extent, related to the relative separation of the two strain relief elements axially of the conductors. This relationship facilitates the application of the strain relief elements to the conductors during the assembly operation, while, at the same time, it provides a progressively increasing resistance to cord stresses during use of the device.

The strain relief arrangement of the invention has the particular important advantage that it provides a strain relief which is especially suited for use in connection with cords that are subject to shock stresses. By forming the recess in the plug body which receives the strain relief elements (the recess 39), in such manner that its thickness (d) is slightly greater than the combined thickness of the two strain relief elements, it is possible to assemble the device without bringing the strain relief elements in close contact with each other. Then, if the slot dimensions have been previously correlated with the conductor jacket dimensions to effect a relatively tight engagement of the conductors when the strain relief elements are in the normal assembled position (and slightly spaced-apart), a severe strain will be resisted in large degree by compression of the jacket on the individual cord conductors, and this will minimize, to a large extent, the likelihood of permanent damage to the conductor itself.

Also, if the body of the plug is cut away so that the central portion of the strain relief elements are unsupported, i. e. if the shoulders 41 have an outline similar to that indicated by the dotted lines 51 in Figure 4, the strain relief elements will be free to bend in the manner of a simple beam, in response to tensional stresses applied to the cord or cable. This will further improve the ability of the device to minimize the likelihood of damage to the conductors during use of the strain relief. The strain relief structure inherently holds the two conductors in spaced-apart relationship in the region of the connector contacts, and this action, coupled with the firm mechanical connection between the conductors and the strain relief elements, substantially decreases the risk of electrical failure within the plug body.

Strain reliefs in accordance with the invention can be used with equally satisfactory results in conjunction with either male or female type plugs, and a male type connector embodying a strain relief in accordance with the invention is illustrated in Figure 6. Essentially, this connector is similar to the connector illustrated in Figure 5. It includes a body 53 which is desirably of molded rubber compound or other suitable elastomer, and this body includes suitable recesses for receiving and supporting the two prong contacts 55. The plug body 53 also includes a suitable recess or passageway 57 at its opposite end for receiving the cord or cable 59 with which the connector is used, and internal passageways 61 and 63 for the individual jacketed conductors 65 and the strain relief 67, as illustrated. The particular strain relief 67 shown in the drawings includes a C-shaped element 35a and an H-shaped element 37a, which are similar in design and function to the elements 35 and 37 previously described.

Bared end portions 69 of the conductor wires are connected to the inner ends of the contacts 55 by soldering or other convenient means. The plug body 53 may be of one-piece construction; it may comprise two complementary half sections; or it may be of the type shown in Wermine Patent No. 1,858,196, are previously described.

The combined C-shaped and H-shaped strain relief elements previously described constitute a particularly satisfactory strain relief structure. Other arrangements embodying certain of the principles of the invention can be used, however, and while these structures are not as satisfactory in all respects as the arrangement previously described, they do provide strain reliefs of considerable utility. A number of such other arrangements are illustrated in the succeeding figures of the drawings.

The strain relief structure illustrated in Figures 7 to 9 includes a pair of punched or molded members 71 and 73, conveniently made from thin sheet material, such as phenolic resin punch-sheet stock .046 inch thick. Each of the elements 71 and 73 is provided with a pair of cord-receiving openings, conveniently circular in outline, as illustrated at 75 and 77. These openings 75 and 77 should have a cross-sectional area approximately equal to the cross-sectional area of the individual, insulated cord conductors with which the strain relief is to be used.

As in the previously described structure, the cooperating openings 75 and 77 are so spaced that they do not align when the two elements 71 and 73 are in superposed relation. The result of the arrangement is to provide off-set passageways through the assembled strain relief, as illustrated particularly in Figure 9; in that figure the jacketed cord conductors with which the strain relief is being used are illustrated at 79.

The strain relief elements 71 and 73, when assembled on the jacketed conductors 79, will be received within a suitable recess within the plug body or other structure with which the unit is used, and are operable to grip the insulating jackets of the individual cord conductors with a progressively tightening grip when the cord or cable is subject to tensional stresses, similar to the previously described arrangement. The device, similar to the previously described structure, is particularly effective in resisting shock stresses, especially when the strain relief elements are supported at their ends.

The arrangement illustrated in Figures 10 through 12 is generally similar to the construction shown in Figures 7 to 9, except that one of the upper elements of the structure, the element 71a, is provided with a central slot 75a, rather than with two separate cord openings. The dimensions of the slot 75a are correlated with reference to the openings 77 provided in the other element 73 in order that the two members 71a and 73 will grip the cord conductors when assembled thereon. The elements constituting both of these embodiments of the invention must be applied to the jacketed conductor prior to the completion of the electrical connectors, and in this respect, the units are not as convenient to assemble as the combination C and H-shaped elements previously described.

The strain relief construction shown in Figures 13 to 15 includes two elements 81 and 83, each having a pair of slots extending into one side thereof, as illustrated at 85 and 87. The slots 85 in the element 81 are spaced closer together than the slots 87 in the coacting element 83, and this unequal spacing is used to effect the desired gripping of the conductor. In order to assure that an arrangement of this type will hold together during use, it is desirable that the slots be inclined somewhat to aid in holding the two elements of the strain relief together.

The strain relief structures illustrated in Figures 1-12 have been shown or described in use in conjunction with electrical connector plugs or the like wherein the strain relief elements are adapted to be received within a suitable recess in the connector body. This arrangement has particular advantage in the operation of the strain relief and in facilitating the assembling of the unit. It is possible, however, to fasten together the two elements of the strain relief and the cord connectors with which the strain relief is used prior to the assembly of the cord and strain relief into the associated connector or other apparatus. This is illustrated in Figure 15, where the two elements of the strain relief are illustrated as connected together by rivets 89. When fastened together in this manner, the strain relief may be used in conjunction with any means providing a shoulder against which the lower element may abut.

Strain relief and conductor spacing means in accordance with the invention, while having particular advantage when used with duplex conductor cords, may be used in conection with other conductor arrangements. For example, by providing additional, cooperating, cord-receiving openings, as indicated by the dotted outlines 91 and 93 in Figure 7, the strain relief may be used with a three conductor cable or cord. The openings 91 and 93, when used, will be of such outline and dimensions that they are not in exact register when the strain relief elements are applied to the cord conductors, and hence, they provide an offset passageway of such dimensions that the strain relief elements will engage and tightly grip the insulating sheath of the associated conductors, as previously described.

The strain relief arrangements described in the foregoing, constitute a simple, and yet highly effective means for preventing the transmission of tension stresses to the electrical connections between the electrical conductor cords, or cables, and the apparatus with which such conductors are used. The strain relief is particularly effective in minimizing conductor and/or insulation damage in the event of shock stresses, and while particularly adapted for use with electrical connector plugs, it is applicable to other types of electrical apparatus.

Various of the features of the invention believed to be new are set forth in the accompanying claims.

We claim:

1. In combination, a conductor cord comprising a plurality of flexible electrical conductors each enclosed in a sheath of yieldable insulating material, a strain relief comprising a pair of co-acting elements adapted to be placed about and to grip said electrical conductors, said co-acting elements each including means defining a plurality of apertures with each aperture in one of said elements being disposed in partial registry with one of the apertures in the other of said elements, each pair of the partially registering apertures defining a passageway for one of said electrical conductors which affords a generally uni-directional path for the conductor through the elements and generally at right angles to the plane of said elements, said partially registering apertures being disposed to provide a restriction in the passageway formed by said apertures, with respect to the cross sectional area of said conductors, as said elements are brought into proximity with each other, whereby the insulating sheath of the associated conductor is firmly gripped between an edge defining one of the apertures and the opposing edge of the other of the pair of apertures.

2. In combination, an electrical connector comprising a body of insulating material and a pair of spaced electrical contacts supported by said body, a conductor cord comprising a pair of flexible electrical conductors each enclosed in a sheath of insulating material, said conductor cord having one end thereof disposed within said body with each of said conductors connected with one of said electrical contacts, a strain relief comprising a pair of co-acting elements disposed within said body and adapted to be placed about and to grip the sheath on said electrical conductors, said co-acting elements each including an aperture for receiving one of said conductors and said elements being disposed so that an aperture in one of said elements is disposed in partial registry with an aperture in the other of said elements to thereby define a passageway for one of said electrical conductors which affords a generally uni-directional path for the conductor through the elements, with said partially registering apertures being disposed to provide a restriction in the passageway formed by said apertures when said elements are brought into proximity with each other, whereby the insulating sheath of the associated conductor is firmly gripped between an edge defining one of the apertures and the opposing edge of the other of the apertures.

3. In combination, an electrical connector comprising a body of insulating material and a pair of spaced electrical contacts supported within said body, a conductor cord comprising a pair of flexible electrical conductors each enclosed in a sheath of insulating material, said conductor cord having one end thereof disposed within said body with each of said conductors connected with one of said electrical contacts, a strain relief comprising a pair of co-acting elements adapted to be placed about and to grip said electrical conductors, means defining a transverse recess in said body receiving said elements in a manner limiting the relative movement between said elements, said co-acting elements each including means defining a plurality of apertures with each aperture in one of said elements being disposed in partial registry with one of the apertures in the other of said elements, each pair of the partially registering apertures defining a generally uni-directional passageway longitudinally of said body for one of said electrical conductors, said partially registering apertures being thereby disposed to provide a restriction in the passageway with respect to the cross-sectional area of the electrical conductor passing through such passageway, whereby the insulating sheath of the associated conductor is firmly gripped between an edge defining one of the apertures and the opposing edge of the other of the pair of apertures.

4. In combination, an electrical connector comprising a body of insulating material and a pair of spaced electrical contacts supported by said body, a conductor cord comprising a pair of flexible electrical conductors each enclosed in a sheath of insulating material, said conductor cord having one end thereof disposed within said body with each of said conductors connected with one of said electrical contacts, a strain relief comprising a pair of co-acting elements disposed within said body and adapted to be placed about and to grip the sheath on said electrical conductors, one of said co-acting elements including an elongated aperture for receiving said conductors, the other of said co-acting elements including a pair of spaced-apart apertures, and said elements being relatively disposed so that said spaced-apart apertures are disposed in partial registry with respectively opposite end portions of said elongated aperture in said one co-acting element to thereby define a passageway for each of said electrical conductors which affords a generally unidirectional path for the conductor through the elements, with said partial registering apertures being disposed to provide a restriction in the passageway formed by said apertures when said elements are brought into proximity with each other, whereby the insulating sheath of the associated conductor is firmly gripped between an edge defining one of said spaced-apart apertures and the opposing edge of said elongated aperture.

5. In combination, an electrical connector comprising a body of insulating material and a pair of spaced electrical contacts supported by said body, a conductor cord comprising a pair of flexible electrical conductors each enclosed in a sheath of insulating material, said conductor cord having one end thereof disposed within said body with each of said conductors connected with one of said electrical contacts, a strain relief comprising a pair of co-acting elements disposed within said body and adapted to be placed about and to grip the sheath on said electrical conductors, one of said co-acting elements being generally C-shaped to thereby provide an elongated aperture for receiving said conductors, the other of said co-acting elements being generally H-shaped to provide a pair of spaced-apart apertures, and said elements being disposed so that each of said spaced-apart apertures in said H-shaped element is disposed in partial registry with one end portion of the elongated aperture provided in said one C-shaped element to thereby define a passageway for each of said electrical conductors which affords a generally uni-directional path for the conductor through the elements, with said partial registering apertures being disposed to provide a restriction in the passageway formed by said apertures when said elements are brought into proximity with each other, whereby the insulating sheath of the associated conductor is firmly gripped between an edge defining one of said spaced-apart apertures and the opposing edge of said elongated aperture.

References Cited in the file of this patent

UNITED STATES PATENTS

| | | |
|---|---|---|
| 501,485 | Ball | July 18, 1893 |
| 1,712,738 | Spidel | May 14, 1929 |
| 2,219,545 | Gordon | Oct. 29, 1940 |
| 2,240,394 | Eaton | Apr. 29, 1941 |
| 2,283,544 | Eaton | May 19, 1942 |
| 2,313,426 | Forstrom | Mar. 9, 1943 |
| 2,634,474 | Grayson | Apr. 14, 1953 |